(12) United States Patent
Giombanco et al.

(10) Patent No.: US 11,031,873 B2
(45) Date of Patent: Jun. 8, 2021

(54) PRIMARY SIDE BURST MODE CONTROLLER FOR LLC CONVERTER

(71) Applicant: Texas Instruments Incorporated, Dallas, TX (US)

(72) Inventors: Salvatore Giombanco, Cassaro (IT); Saurav Bandyopadhyay, Dallas, TX (US); Rosario Davide Stracquadaini, San Gregorio di Catania (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 245 days.

(21) Appl. No.: 15/396,031

(22) Filed: Dec. 30, 2016

(65) Prior Publication Data
US 2018/0191256 A1 Jul. 5, 2018

(51) Int. Cl.
*H02M 3/335* (2006.01)
*H02M 1/08* (2006.01)
*H02M 1/00* (2006.01)

(52) U.S. Cl.
CPC ......... *H02M 3/33546* (2013.01); *H02M 1/08* (2013.01); *H02M 3/33592* (2013.01); *H02M 2001/0009* (2013.01); *H02M 2001/0035* (2013.01); *H02M 2001/0058* (2013.01)

(58) Field of Classification Search
CPC ......... H02M 2001/0035; H02M 3/335; H02M 3/33507; H02M 3/33569; H02M 3/337; H02M 3/3376; Y02B 70/1433; Y02B 70/16
See application file for complete search history.

(56) References Cited

U.S. PATENT DOCUMENTS

| 9,318,966 B2 | 4/2016 | Ferrazza et al. |
| 2010/0039836 A1* | 2/2010 | Gong .................... H02M 3/156 363/21.13 |
| 2010/0219802 A1* | 9/2010 | Lin .................... H02M 3/33507 323/284 |

(Continued)

FOREIGN PATENT DOCUMENTS

| CN | 102739018 A | 10/2012 |
| CN | 105049034 A | 11/2015 |
| EP | 2479879 A1 | 7/2012 |

OTHER PUBLICATIONS

PCT Search Report for Application No. PCT/US 2017/069004, dated Apr. 5, 2018.

(Continued)

*Primary Examiner* — Fred E Finch, III
(74) *Attorney, Agent, or Firm* — Michelle F. Murray; Charles A. Brill; Frank D. Cimino

(57) ABSTRACT

Embodiments include systems, methods, and apparatuses for controlling off-time during a burst mode in an LLC converter. In one embodiment, a circuit comprises an LLC converter having a primary side and a burst mode controller, the burst mode controller configured to monitor, on the primary side of the LLC converter, electrical current, and in response to a determination that the electrical current is below a first threshold, increase an off-time for switches in the LLC converter and in response to a determination that the electrical current is above a second threshold that is higher than the first threshold, decrease the off-time for the switches in the LLC converter.

15 Claims, 5 Drawing Sheets

(56) References Cited

U.S. PATENT DOCUMENTS

| | | | | |
|---|---|---|---|---|
| 2011/0084677 A1 | 4/2011 | Shi et al. | | |
| 2011/0085354 A1 | 4/2011 | Wang et al. | | |
| 2012/0250378 A1* | 10/2012 | Kok | ............... | H02M 3/156 363/78 |
| 2013/0094248 A1* | 4/2013 | Jacques | ............... | H02M 3/3385 363/19 |
| 2013/0229829 A1* | 9/2013 | Zhang | ............... | H02M 3/33569 363/16 |
| 2014/0003094 A1* | 1/2014 | Sorensen | ............... | H02M 3/337 363/21.02 |
| 2014/0307478 A1* | 10/2014 | Leisten | ............... | H02M 3/33523 363/15 |
| 2015/0003117 A1* | 1/2015 | Ferrazza | ............... | H02M 3/33546 363/21.02 |
| 2015/0077003 A1 | 3/2015 | Vonach et al. | | |
| 2015/0311795 A1* | 10/2015 | Yang | ............... | H02M 3/156 323/271 |
| 2016/0099639 A1* | 4/2016 | Leisten | ............... | H02M 3/3376 323/271 |
| 2016/0164425 A1* | 6/2016 | Chen | ............... | H02M 3/33553 363/21.07 |
| 2016/0294273 A1* | 10/2016 | Kawamura | ............... | H02M 3/33523 |
| 2017/0187298 A1* | 6/2017 | Lin | ............... | H02M 3/33523 |
| 2017/0237356 A1* | 8/2017 | Chen | ............... | H02M 3/33553 363/21.02 |

OTHER PUBLICATIONS

Chinese Office Action dated Sep. 18, 2020, Chinese Application No. 201780066763.8, 10 pages.

\* cited by examiner

PRIMARY SIDE BURST MODE CONTROLLER FOR LLC CONVERTER

FIELD OF THE INVENTION

This invention relates generally to LLC converters and, more particularly, operating LLC converters in a burst mode.

BACKGROUND OF THE INVENTION

The efficiency of an LLC converter is dependent upon the load applied to the LLC converter. Efficiency is maximized when LLC converters are operated between medium- and full-load. LLC converters are least efficient when operated at light-load, due in part to losses that remain constant as load decreases. In an effort to improve the efficiency of LLC converters at light-load, systems have been devised that reduce switching losses. For example, LLC converters can be operated in a burst mode in which gate switching signals are blocked, causing the half bridge switches to remain off for a period of time. These strategies, however, monitor load conditions on the secondary side of the LLC converter. The information gathered at the secondary side is then provided to a driving mechanism for the LLC converter. The driving mechanism is on the primary side of the LLC converter. Consequently, monitoring an LLC converter from the secondary side introduces additional complexities (e.g., an increased number of components) and costs, reducing the benefits of operating an LLC converter in burst mode.

BRIEF DESCRIPTION OF THE DRAWINGS

Embodiments of the invention are illustrated in the figures of the accompanying drawings in which.

DETAILED DESCRIPTION

As previously discussed, the efficiency of an LLC converter is dependent upon the load supplied to the LLC converter. More specifically, LLC converters are less efficient when under light-load. Light-load efficiency of an LLC converter can be increased by utilizing a burst mode. When in burst mode, switching operations of the half bridge switches are blocked during an "off-time" and then resumed during a "burst time." Current on the primary side of the LLC converter is controlled by manipulating the off-time during the burst mode. For example, as the load drops below a threshold, the off-time of the half bridge switches can be increased to increase current in the LLC converter and thus increase the efficiency of the LLC converter under light-load. Current approaches perform measurements on the secondary side of the LLC converter to determine the load applied to the LLC converter. Taking measurements on the secondary side of the LLC converter introduces additional costs and complexities because information must be transmitted back to the primary side of the LLC converter through an isolation barrier. The additional componentry necessary to facilitate this transmission increase the complexity of the circuit, and thus, the cost of the circuit.

Embodiments of the inventive subject matter seek to avoid the drawbacks of current burst mode implementations by performing measurements on the primary side of an LLC converter to determine load conditions of the LLC converter. Specifically, the primary side current of the LLC converter (i.e., the electrical current on the primary side of the LLC converter) is measured. In some embodiments, this measurement can be performed as described in U.S. patent application Ser. No. 15/395,971, which is incorporated by reference herein. When the current falls below a threshold, a burst mode is entered and the off-time of the half bridge switches can be manipulated to reduce the equivalent switching frequency and increase the primary side current of the LLC converter. Because the load conditions are determined based on a measurement from the primary side of the LLC converter, embodiments of the inventive subject matter obviate the need for the additional componentry, and costs, associated with determining load conditions based on measurements taken from the secondary side of the LLC converter and transmitting information to the primary side of the LLC converter.

Figure 1:
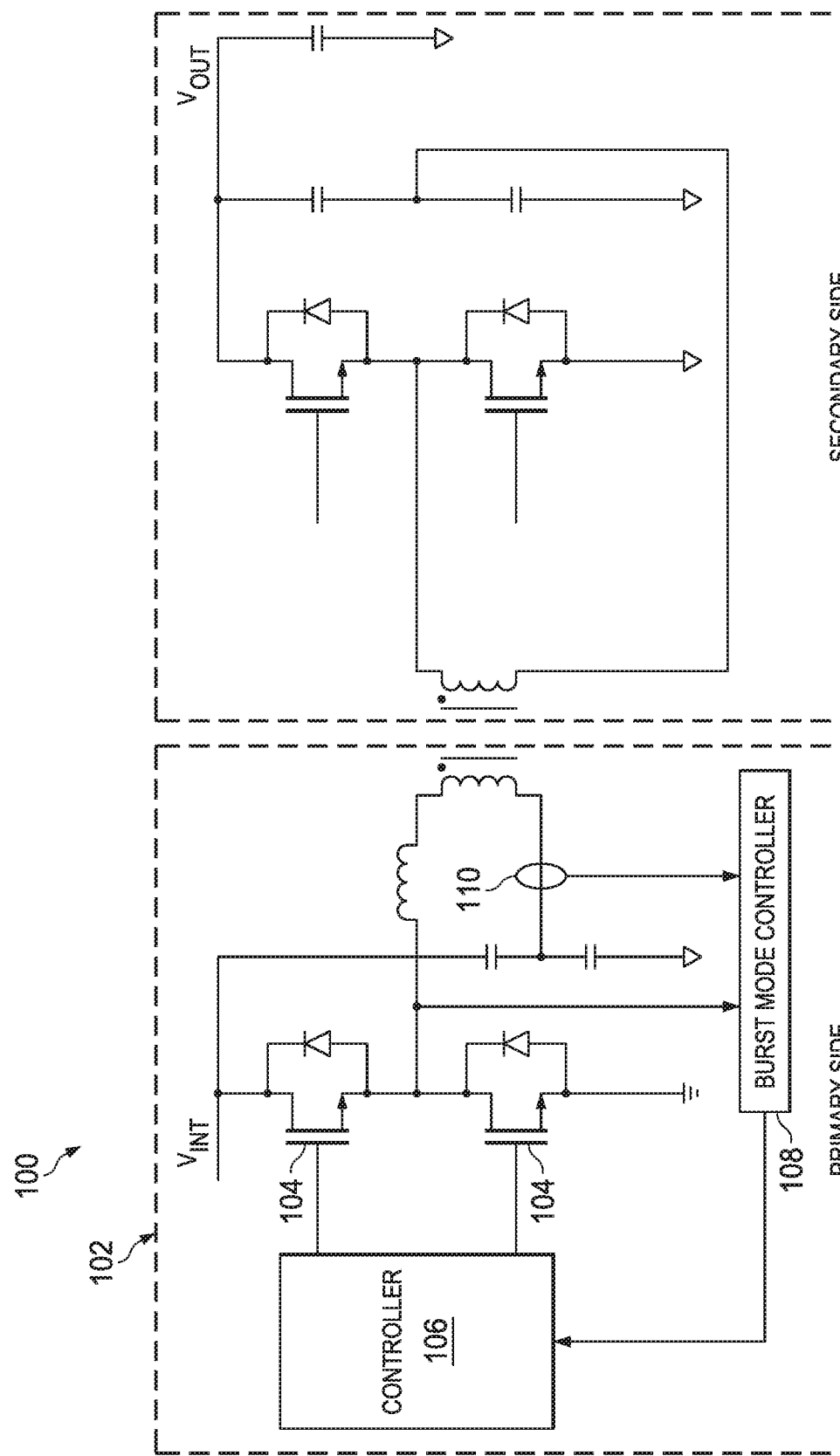
FIG. 1 depicts an LLC converter 100 including a burst more controller 108 that operates on a primary side 102 of the LLC converter 100, according to some embodiments.

In some embodiments, the off-time of the half bridge switches during burst mode is manipulated to maintain a desired current on the primary side of the LLC converter. Once the burst mode is entered, if the primary side current falls below a first threshold, the off-time of the half bridge switches is increased, increasing the primary side current. Additionally, if the primary side current passes above a second threshold, the off-time of the half bridge switches is decreased, decreasing the primary side current. In this manner, the primary side current can be maintained within the first and second thresholds. In some embodiments, the off-time of the half bridge switches can be adjusted on a cycle-by-cycle basis (i.e., at each switching cycle of the half bridge switches) to maintain the current within the thresholds. Finally, if the current surpasses a third threshold, the burst mode can be exited. FIG. 1 depicts an example circuit including a burst mode controller that is capable of manipulating the off-time of the half bridge switches to maintain the current within the thresholds.

FIG. 1 depicts an LLC converter 100 including a burst more controller 108 that operates on a primary side 102 of the LLC converter 100, according to some embodiments. The LLC converter includes, among other components, half bridge switches 104 and a controller 106. The controller 106 includes the hardware and logic necessary to drive the half bridge switches 104. Although FIG. 1 depicts the controller 106 and the burst mode controller 108 as distinct components, in some embodiments the controller 106 and the burst mode controller 108 can be a single component including the hardware and logic necessary to measure the primary side current, determine an off-time for the half bridge switches 104, and drive the half bridge switches 104.

The burst mode controller 108 monitors the primary side 102 of the LLC converter (e.g., via a sensor 110). Based on the monitoring, the burst mode controller 108 determines whether the controller 106 should drive the half bridge switches 104 in a burst mode or in a normal mode. If the half bridge switches 104 are to be driven in the burst mode, the burst mode controller 108 determines an off-time for the half bridge switches 104 to be used while in the burst mode. Additionally, the burst mode controller 108 can determine that the burst mode should be exited and that the normal mode should resume, if appropriate.

In some embodiments, the burst mode controller 108 monitors the current on the primary side 102 of the LLC converter 100 (i.e., the primary side current). The current on the primary side 102 varies based on the load applied to the LLC converter 100. The burst mode controller 108 attempts to maintain the primary side current at a level which will allow the LLC converter 100 to run efficiently (e.g., between fifty percent and seventy-five percent of the full load). Specifically, if the primary side current is too low, the burst mode controller 108 will instruct the controller 106 to drive the half bridge switches 104 in the burst mode. When in the burst mode, the half bridge switches 104 do not operate continuously. Instead, there will be a period in which neither of the half bridge switches 104 is on (i.e., the off-time). The primary side current is dependent upon the off-time such that as off-time increases, the primary side current increases, and as the off-time decreases, the primary side current decreases. The burst mode controller 108 monitors the primary side current and determines whether the off-time should be increased, decreased, or held constant. In some embodiments, the burst mode controller 108 makes this determination on a cycle-by-cycle basis.

In one form, the burst mode controller 108 compares the primary side current to one or more thresholds and determines the off-time, and whether to enter or exit the burst mode, based on the comparison. For example, the burst mode controller 108 can compare the primary side current to two thresholds: a first threshold and a second threshold. In this example, the first threshold is a lower current threshold such that the burst mode controller 108 will attempt to maintain the primary side current above the first threshold and the second threshold is an upper current threshold such that the burst mode controller 108 will attempt to maintain the primary side current below the second threshold. If the primary side current falls below the first threshold while the LLC converter 100 is operating in the burst mode, the burst mode controller 108 will increase the off-time of the half bridge switches 104 to increase the primary side current. If the primary side current exceeds the second threshold while the LLC converter 100 is operating in the burst mode, the burst mode controller 108 will decrease the off-time of the half bridge switches 104 to decrease the primary side current. Put simply, the burst mode controller 108 will manipulate the off-time of the half bridge switches 104 while the LLC converter 100 operates in the burst mode to maintain the primary side current between the first threshold and the second threshold.

In addition to determining the off-time of the half bridge switches 104 while the LLC converter 100 is operating in the burst mode, in some embodiments, the burst mode controller 108 can also determine whether to enter, or exit, the burst mode. For example, the burst mode controller 108 can compare the primary side current to a third threshold. If the LLC converter 100 is operating in the normal mode (i.e., not in the burst mode) and the primary side current falls below the third threshold, the burst mode controller 108 can cause the LLC converter 100 to enter the burst mode. Additionally, while in the burst mode, if the primary side current exceeds the third threshold, the burst mode controller 108 can cause the LLC converter 100 to exit the burst mode.

Figure 2A:
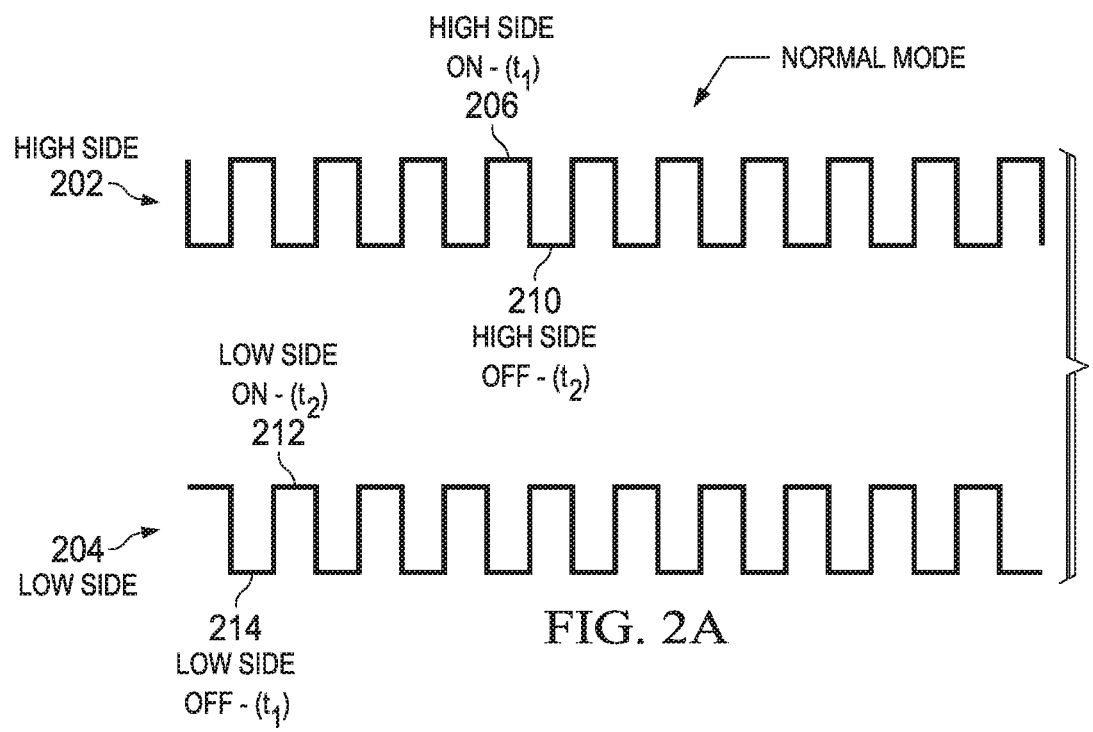
FIGS. 2A and 2B depict waveforms associated with half bridge switches of an LLC converter, according to some embodiments.
Figure 2B:
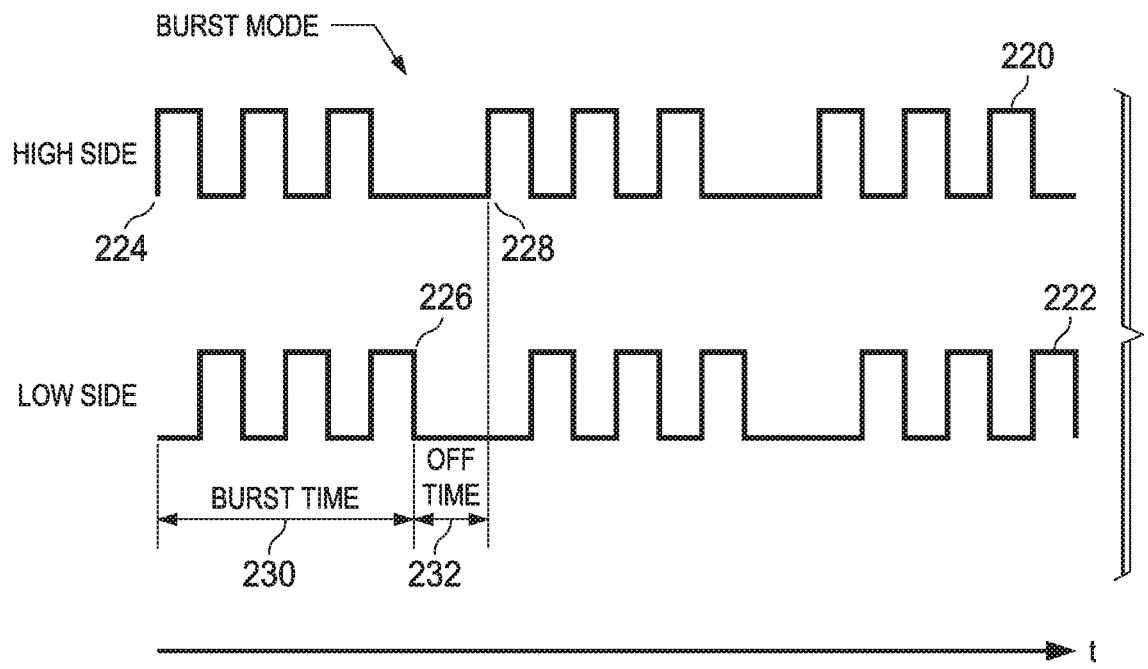

While the discussion of FIG. 1 describes an example LLC converter that includes a burst mode controller that controls burst mode operations and manipulates the off-time of the half bridge switches during burst mode operation, the discussion of FIGS. 2A and 2B provides more detail regarding the half bridge switches and operating the half bridge switches in a burst mode.

FIG. 2A depicts waveforms associated with half bridge switches of an LLC converter while the LLC converter is operating in a "normal mode" (i.e., not in a "burst mode"). FIG. 2A includes two waveforms: a high side waveform 202 associated with a high side switch of an LLC converter and a low side waveform 204 associated with a low side switch of an LLC converter. The peaks of the high side waveform 202 indicate that the high side switch is on and the troughs of the high side waveform 202 indicate that the high side switch is off. As one example, the high side waveform 202 indicates that the high side switch is on at peak 206 (during time period $t_1$) and that the high side switch is off at trough 210 (during time period $t_2$). Similarly, the peaks of the low side waveform 204 indicate that the low side switch is on and the troughs of the low side waveform 204 indicate that the low side switch is off. As one example, the low side waveform 204 indicates that the low side switch is on at peak 212 (during time period $t_2$) and that the low side switch is off at trough 214 (during time period $t_1$). As indicated by the high side waveform and the low side waveform 204, when the high side switch is on, the low side switch is off, and vice versa. The high side switch and low side switch alternate from on to off, and off to on, states, respectively, at each cycle. As FIG. 2A depicts the LLC converter operating in the normal mode, the high side switch and low side switch alternate between on and off without any significant time period elapsing between the high side switch being on and the low side switch being on.

FIG. 2B depicts waveforms associated with half bridge switches of an LLC converter while the LLC converter is operating in a burst mode. FIG. 2B includes two waveforms: a high side waveform 220 associated with a high side switch of an LLC converter and a low side waveform 222 associated with a low side switch of an LLC converter. As with FIG. 2A, the peaks and troughs of the high side wave form 220 and the low side waveform 222 indicate when each switch is on and off. While the LLC converter is operated in the burst mode, when the high side switch is on, the low side switch is off, and vice versa.

Contrary to operation during the normal mode in which there is no significant time period between one switch turning off and the other switch turning on, while operating in the burst mode there are times in which both the high side switch and low side switch are off. Both the high side switch and the low side switch are off during the off-time 232. The high side switch and low side switch alternate between on and off states during the burst time 230.

Introducing off-time while in burst mode increases the primary side current of the LLC converter when the LLC converter is in a light-load condition. As depicted in FIG. 2B, the burst time begins at a point 224 when the high side switch turns on and ends at a point 226 when the low side switch turns off. Accordingly, the burst time occurs between the points 224 and the point 226, as well during other time periods when the high side switch and the low side switch are alternating between on and off states. After the burst time 230, the LLC converter enters the off-time in which both the high side switch and the low side switch are off. When in the burst mode, the off-time causes the primary side current to increase, potentially mitigating the efficiency losses of a light-load condition.

Figure 3:
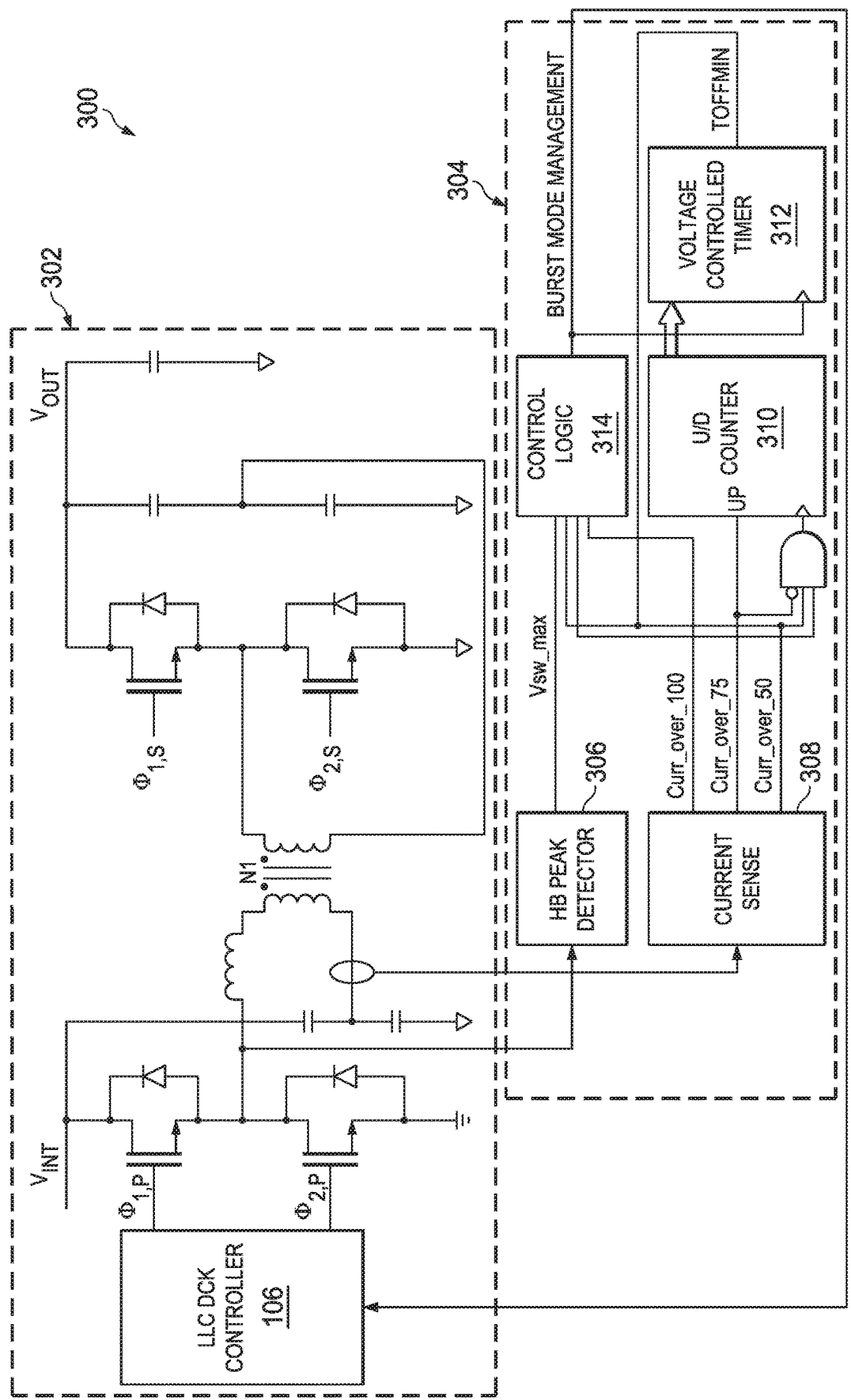
FIG. 3 depicts a circuit 300 including an LLC converter 302 and an example burst mode controller 304, according to some embodiments.

While the discussion of FIGS. 2A and 2B describes the normal mode and burst mode of an LLC converter in more detail with respect to exemplary waveforms, the discussion of FIG. 3 describes circuitry that comprises an example burst mode controller.

FIG. 3 depicts a circuit 300 including an LLC converter 302 and an example burst mode controller 304, according to some embodiments. The example burst mode controller 304 includes a peak detector 306, a current sensing device 308, an up/down counter 310, a timer 312, and control logic 314. The peak detector 306 monitors the voltage at the switching node of the half bridge switches of the LLC converter 302. The current sensing device monitors current in the LLC converter 302. The current sensing device 308 can be any sensor suitable to monitor current. The up/down counter 310 increments and decrements the step upon which the off-time is based, dependent upon the output of the current sensing device 308 and/or the control logic 314.

Figure 4:
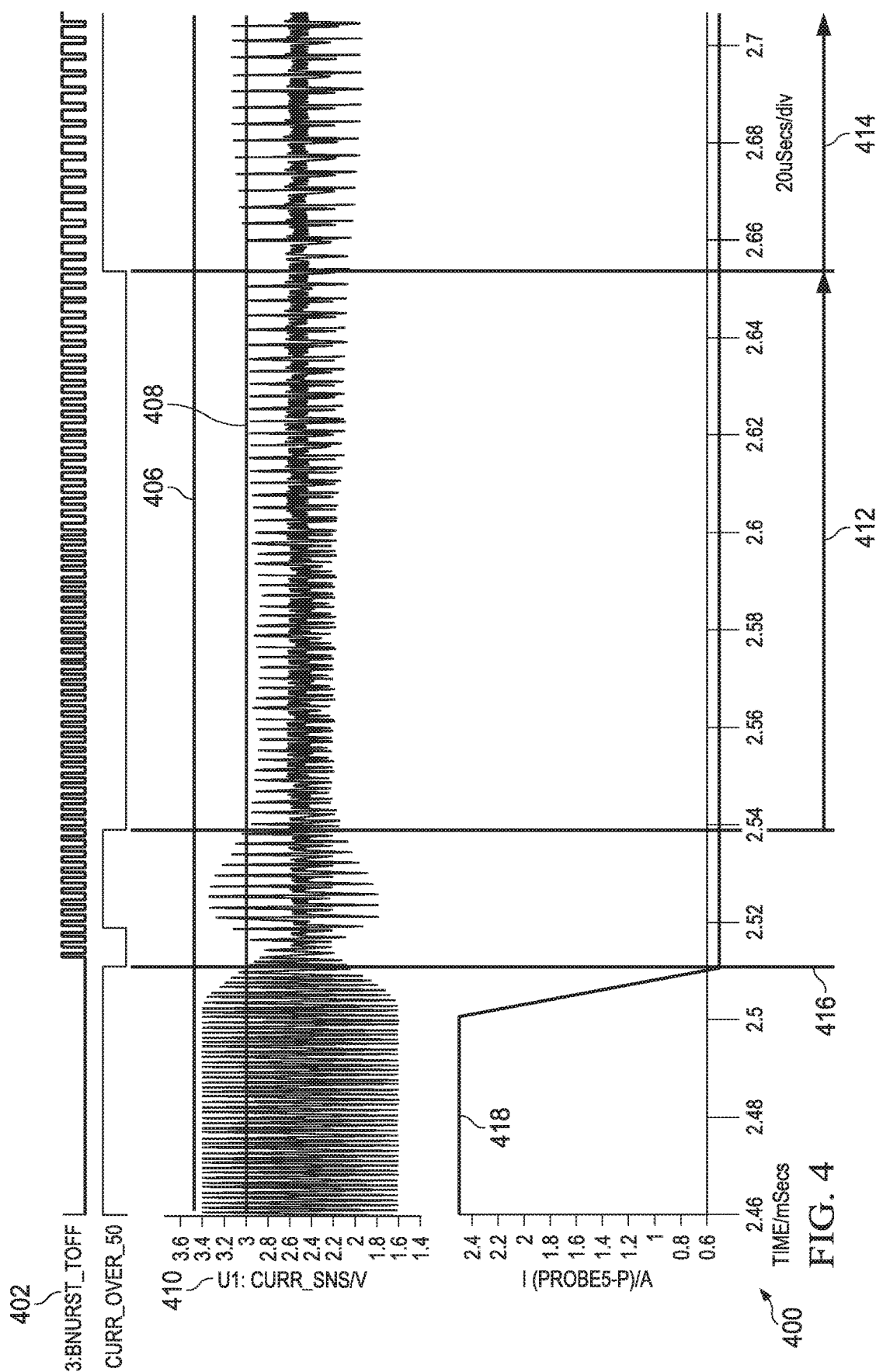
FIG. 4 is a chart 400 including waveforms associated with an LLC converter, according to some embodiments.

While the discussion of FIG. 3 describes circuitry that comprises an example burst mode controller, the discussion of FIG. 4 describes one embodiment of manipulating the off-time of half bridge switches of an LLC converter during burst mode operation to control primary side current in the LLC converter with respect to exemplary waveforms.

FIG. 4 is a chart 400 including waveforms associated with an LLC converter, according to some embodiments. The discussion of FIG. 3 addresses two waveforms in the chart 400: an off-time waveform 402 and a current waveform 410. The off-time waveform 402 depicts the off-time of the half bridge switches of the LLC converter while the LLC converter is operating in a burst mode. The width of the peaks of the off-time waveform 402 is indicative of the duration of the off-time for each cycle. The current waveform 410 depicts primary side current of the LLC converter. An upper threshold line 406 indicates an upper current threshold and the lower threshold line 408 indicates a lower current threshold. A load current waveform 418 depicts the load current applied to the LLC converter. As can be seen from the current waveform 410 and the load current waveform 418, when the load current decreases, the primary side current will also decrease. When the load current decreases to the point where the LLC converted is no longer operating efficiently, the burst mode will be entered.

Before a point 416, the primary side current is maintained within the thresholds, as indicated by the amplitude of the current waveform 410 being above the lower threshold line 408 and below the upper threshold line 406. However, at the point 416, the primary side current drops below the lower threshold line 408. As can be seen from load current waveform 418 and the current waveform 410, the drop in the load current causes the primary side current to drop below the lower threshold line 408. At this point, the LLC converter enters the burst mode and manipulates the off-time of the half bridge switches in an attempt to increase the primary side current and maintain the primary side current between the thresholds. In some embodiments, the LLC converter does not enter the burst mode until after a predetermined number of cycles. For example, in one approach, the LLC converter will enter the burst mode after the current remains outside of the thresholds for three cycles. Waiting for a predetermined number of cycles before entering the burst mode provides a buffer and can prevent the LLC converter from entering the burst mode erroneously. For example, the buffer can prevent the LLC converter from entering the burst mode based on an erroneous measurement, a fleeting change in primary side current or load, etc.

During a first time period 412, the primary side current is below the lower threshold, as indicated by the current waveform 410 and the lower threshold line 408. During the first time period, the off-time of the half bridge switches is increased in an attempt to increase the primary side current until it is within the thresholds. As can be seen, the width peaks of the off-time waveform 402 is increasing during the first time period 412, indicating that the off-time of the half bridge switches is increasing during the first time period 412. The first time period 412 ends when the primary side current is once again within the thresholds (i.e., the primary side current is above the lower threshold line 408 and below the upper threshold line 406). Once the primary side current is within the thresholds, a second time period 414 begins. During the second time period 414, the off-time of the half bridge switches remains constant, as the primary side current is between the thresholds.

Figure 5:
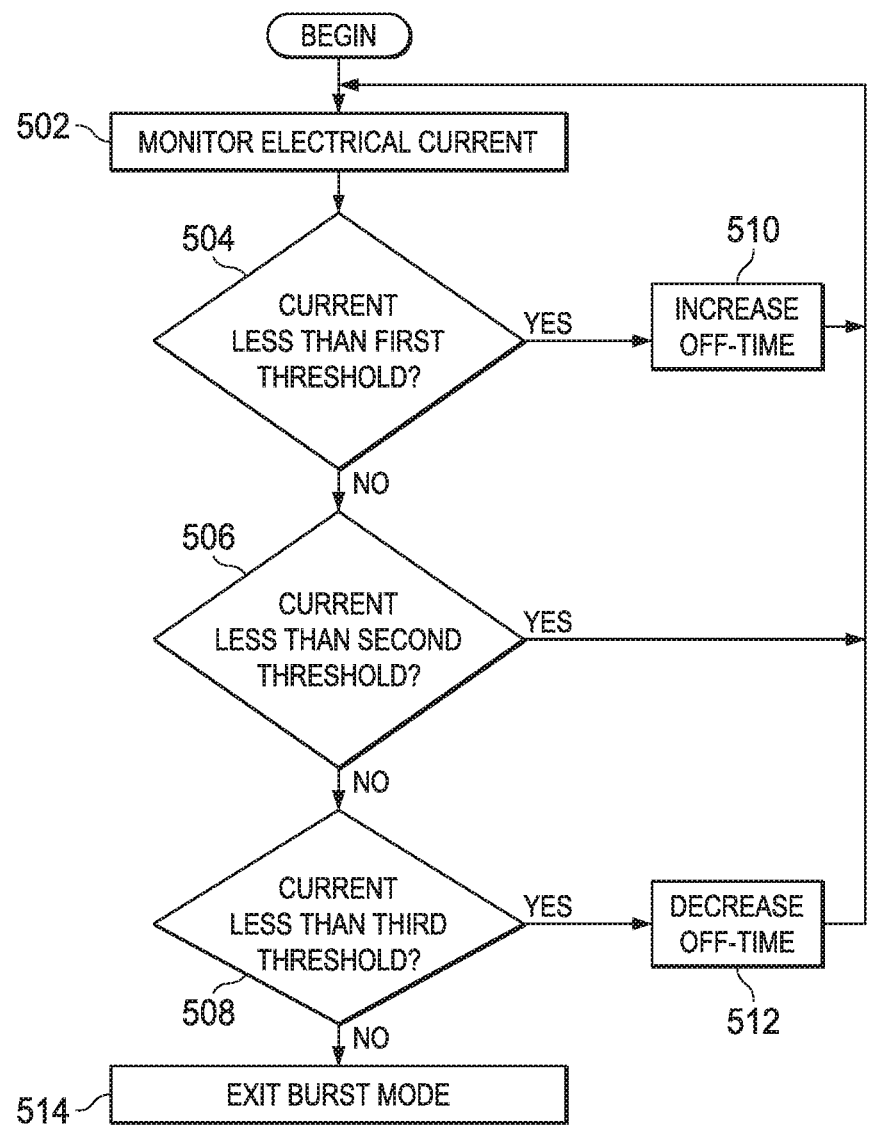
FIG. 5 is a flow chart depicting example operations for implementing a burst mode via a burst mode controller on a primary side of an LLC converter, according to some embodiments.

While the discussion of FIG. 4 describes manipulating the off-time of half bridge switches of an LLC converter during a burst mode, the discussion of FIG. 5 describes example operations for manipulating the off-time of the half bridge switches of an LLC based on monitoring the primary side current of the LLC converter.

FIG. 5 is a flow chart depicting example operations for implementing a burst mode via a burst mode controller on a primary side of an LLC converter, according to some embodiments. The example operations depicted in FIG. 5 begin at a point in time in which the LLC converter is operating in a burst mode. As previously discussed, the burst mode controller can manipulate the off-time of half bridge switches during a burst mode and determine whether to enter, or exit, a burst mode. The flow begins at block 502.

At block 502, current is monitored. For example, the burst mode controller can monitor the current via a current sensor. In some embodiments, the burst mode controller monitors the current from the primary side of the LLC converter. While in the burst mode, the burst mode controller manipulates the off-time of the half bridge switches to control the primary side current. In one embodiment, the burst mode controller manipulates the off-time of the half bridge switches to maintain the primary side current between thresholds. The flow continues at decision diamond 504.

At decision diamond 504, it is determined whether the current is less than a first threshold. For example, the burst mode controller can determine whether the primary side current is below the first threshold. The first threshold can be a lower threshold and can be predetermined or dynamically determined based on conditions within, or associated with, the LLC converter. In some embodiments, the first threshold is based on a target (e.g., a target current). For example, the first threshold can be 50% of the target (or any suitable proportion of the target). If the current is not less than the first threshold, the flow continues at decision diamond 406. If the current is less than the first threshold, the flow continues at block 510.

At block 510, the off-time is increased. For example, the burst mode controller can increase the off-time of the half bridge switches. Increasing the off-time of the half bridge switches increases the primary side current. In some embodiments, the burst mode controller can increase the off-time of the half bridge switches in steps. For example, for each cycle that the primary side current is below the first threshold, the burst mode controller can increase the off-time of the half bridge switches by one step. Additionally, or alternatively, the burst mode controller can increase the off-time of the half bridge switches in multiple steps or an amount that is calculated by the burst mode controller. For example, if the primary side current is significantly below the first threshold (e.g., 10%, 20%, etc. below the first threshold), the burst mode controller can increase the off-time by multiple steps (e.g., a fixed number of steps or a number of steps that is dependent based upon how far below the first threshold to the primary side current is) or calculate an off-time (e.g., based upon conditions within, or associated with, the LLC converter). After the off-time is increased, the flow continues to block 502, where the current is again monitored. As previously discussed, in some embodiments, the off-time is continually adjusted on a cycle-by-cycle basis.

As previously discussed, at decision diamond 504 the current is not less than the first threshold, the flow continues at decision diamond 506. At decision diamond 506, it is determined if the current is less than a second threshold. For example the burst mode controller can determine if the current is less than the second threshold. The second threshold can be an upper threshold and can be predetermined or dynamically determined. The second threshold can be value that the primary side current should maintained below. In some embodiments, the second threshold is based on a target (e.g., a target current). For example, the second threshold can be 50%, 75%, or 100% of the target (or any other suitable proportion of the target). If the current is less than the second threshold, the off-time is not changed and the flow continues at block 402, where electrical current is monitored. If the current is greater than the second threshold, the flow continues at decision diamond 508.

At decision diamond 508, it is determined if the current is less than a third threshold. For example, the burst mode controller can determine if the current is below the third threshold. The third threshold can be a maximum limit for the burst mode. In some embodiments, the third threshold is the target. The third threshold can be predetermined or determined dynamically. In some embodiments, the third threshold is based on a target (e.g., a target current). If the current is less than the third threshold, the flow continues at block 512. If the current is not less than the third threshold, the flow continues at bock 514.

At block 514, the burst mode is exited. For example, the burst mode controller can cause the burst mode to be exited. As previously discussed, the third threshold can be a maximum limit for the burst mode. For example, if the current surpasses the maximum limit for the burst mode, it may no longer necessary, or efficient, to operate the LLC converter in the burst mode. In this case, the LLC converter would return to the normal mode. In some embodiments, the burst mode controller continues to monitor the current during the normal mode. If the current again falls below the third threshold (or a different threshold, such as a minimum limit for the normal mode), the LLC converter can again enter the burst mode and resume the example operations depicted in FIG. 5.

As previously discussed, at decision diamond 506 if the current is between the second threshold and the third threshold, the flow continues at block 512. At block 512, the off-time is decreased. For example, the burst mode controller can decrease the off-time of the half bridge switches. The second threshold can be an upper threshold and the burst mode controller can manipulate the off-time of the half bridge switches to maintain the primary side current between the first and second thresholds. Since it was determined that the current was between the second and third thresholds (i.e., above the second threshold but below the third threshold), the burst mode controller decreases the off-time to decrease the primary side current. In some embodiments, the burst mode controller can decrease the off-time of the half bridge switches in steps. For example, for each cycle that the primary side current is above the second threshold, the burst mode controller can decrease the off-time of the half bridge switches by one step. Additionally, or alternatively, the burst mode controller can decrease the off-time of the half bridge switches in multiple steps or an amount that is calculated by the burst mode controller. For example, if the primary side current is significantly above the second threshold (e.g., 10%, 20%, etc. below the first threshold), the burst mode controller can decrease the off-time by multiple steps (e.g., a fixed number of steps or a number of steps that is dependent based upon how far above the second threshold to the primary side current is) or calculate an off-time (e.g., based upon conditions within, or associated with, the LLC converter). After the off-time is decreased, the flow continues to block 502, where the current is again monitored. As previously discussed, in some embodiments, the off-time is continually adjusted on a cycle-by-cycle basis.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An LLC converter having a primary side, the LLC converter comprising:
   switches; and
   a controller coupled to the switches, the controller configured to:
   in response to determining that a primary side current of the LLC converter is below a first threshold, increase an off-time for the switches;
   in response to determining that the primary side current is above a second threshold, decrease the off-time for the switches, wherein the second threshold is higher than the first threshold;
   in response to determining that the primary side current falls below a third threshold, initiate burst mode, wherein the third threshold is higher than the second threshold; and
   in response to determining that the primary side current exceeds the third threshold, initiate exiting the burst mode.

2. The LLC converter of claim 1, wherein at least one of the first threshold or the second threshold is based on a target current.

3. The LLC converter of claim 2, wherein the first threshold is fifty percent of the target current and wherein the second threshold is seventy-five percent of the target current.

4. The LLC converter of claim 1, wherein the controller is configured to repeat increasing the off-time over a series of switching cycles until the primary side current exceeds the first threshold.

5. The LLC converter of claim 1, wherein the controller is configured to repeat decreasing the off-time over a series of switching cycles until the primary side current falls below the second threshold.

6. The LLC converter of claim 1, wherein the controller comprising a peak detector, a current sensing device, an up/down counter, a timer, and control logic.

7. A method comprising:
   in response to determining, by a controller, that a primary side current of an LLC converter is below a first threshold, increasing an off-time for switches in the LLC converter;

in response to determining, by the controller, that the primary side current is above a second threshold, decreasing the off-time of the switches in the LLC converter, wherein the second threshold is higher than the first threshold;

in response to determining, by the controller, that the primary side current falls below a third threshold, initiate burst mode, wherein the third threshold is higher than the second threshold; and in response to determining, by the controller, that the primary side current exceeds the third threshold, initiate exiting the burst mode.

8. The method of claim 7, wherein at least one of the first threshold or the second threshold is based on a target current.

9. The method of claim 8, wherein the first threshold is fifty percent of the target current and wherein the second threshold is seventy-five percent of the target current.

10. The method of claim 7, wherein increasing the off-time is repeated each switching cycle until the primary side current exceeds the first threshold.

11. The method of claim 7, wherein decreasing the off-time is repeated each switching cycle until the primary side current falls below the second threshold.

12. A controller adapted to be coupled to switches in an LLC converter, the controller configured to:

in response to determining that a primary side current of the LLC converter is below a first threshold, increase an off-time for switches in the LLC converter in response to determining that the primary side current is above a second threshold, decrease the off-time of the switches in the LLC converter, wherein the second threshold is higher than the first threshold;

in response to determining that the primary side current falls below a third threshold, initiate burst mode, wherein the third threshold is higher than the second threshold; and in response to determining that the primary side current exceeds the third threshold, initiate exiting the burst mode.

13. The controller of claim 12, wherein at least one of the first threshold or the second threshold is based on a target current.

14. The controller of claim 13, wherein the first threshold is fifty percent of the target current and wherein the second threshold is seventy-five percent of the target current.

15. The controller of claim 12, comprising a peak detector, a current sensing device, an up/down counter, a timer, and control logic.

* * * * *